(No Model.)
G. F. EBERHARD & J. E. RENZ.
TRACE SUPPORTER.
No. 289,519. Patented Dec. 4, 1883.
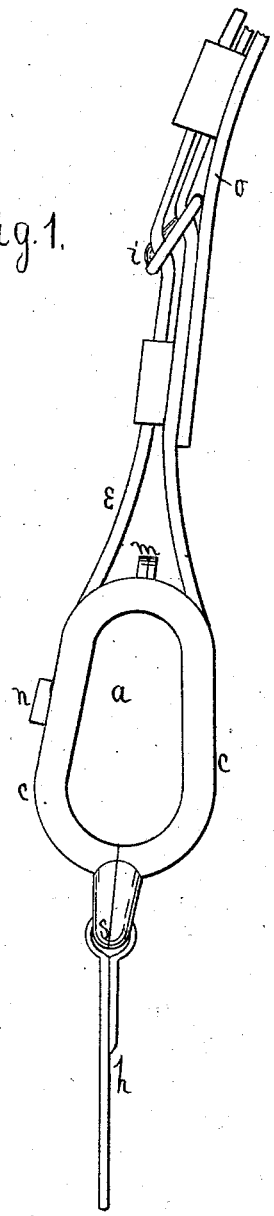
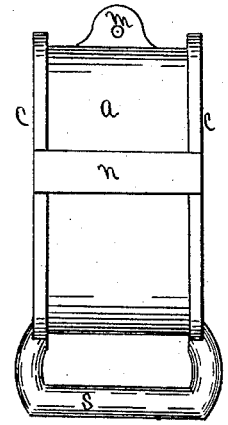
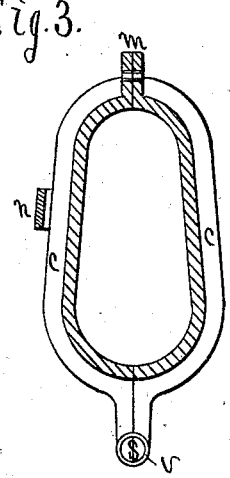
Witnesses
Henry F. Robinson
Geo. F. Robinson
Inventors
George F. Eberhard
John E. Renz
by Bradford Howland
Attorney.

UNITED STATES PATENT OFFICE.

GEORGE F. EBERHARD, OF CLEVELAND, AND JOHN E. RENZ, OF MEDINA, OHIO.

TRACE-SUPPORTER.

SPECIFICATION forming part of Letters Patent No. 289,519, dated December 4, 1883.

Application filed August 8, 1883. (No model.)

*To all whom it may concern:*

Be it known that we, GEORGE F. EBERHARD, of the city of Cleveland and State of Ohio, and JOHN E. RENZ, of Medina, Ohio, have invented a new and useful Improvement in Trace-Supporters, of which the following is a specification.

This invention consists of an improved article of manufacture formed of metal or other suitable material to be placed within the pad-billet of a harness, to receive and support the trace in a proper position, prevent wearing from the chafing of the trace against the pad-billet, and facilitate the vertical adjustment of the trace.

In the drawings forming a part of this specification, Figure 1 represents our improved trace-supporter in proper position for use in connection with the pad-billet of a harness. Fig. 2 is a front elevation, and Fig. 3 is a vertical section.

The trace-supporter $a$ is formed with an opening of suitable dimensions to receive the harness-trace. Its flanges $c\ c$ form a groove or cavity in its circumference to receive the pad-billet $e$, which is bent around it in the form of a loop. It is also formed with a loop, $s$, at its lower end, to which strap $h$ is attached, and with a cross-bar, $n$, to assist in retaining it in the loop of the pad-billet $e$. It protects the pad-billet from being worn by the rubbing and chafing caused by the motion up and down of the trace. The trace may be adjusted up and down by raising and lowering its supporter $a$. This is done by shortening and lengthening the loop of pad-billet $e$, the free end of which is connected with pad $o$ by a buckle, $i$, for that purpose.

The trace-supporter herein described may be constructed in any suitable form to be retained and held by the pad-billet and permit the free passage of the trace through it, and it may be made of metal, rubber, or any other suitable material. It is formed in half-sections, with lugs $m\ m$ at the top riveted together. The half-sections are held together at the bottom by a ferrule or sheet-metal sleeve, $v$, placed around the sections of the end bar of loop $s$, with the ends of the sleeve in contact with the side bars of loop $s$, to prevent any lateral motion or sliding of the sections against each other.

We claim as our invention—

A trace-supporter formed of two similar sections with flanges $c\ c$, lugs $m\ m$, riveted together, and loop $s$, provided with sleeve $v$, surrounding the sections of the end bar of the loop and extending to the side bars of the loop, substantially as described.

GEORGE F. EBERHARD.
JOHN E. RENZ.

Witnesses:
J. M. HAMILL,
WM. H. STANLEY,
G. B. HAMILTON,
EPHRAIM BRENNER.